US008857892B1

(12) United States Patent
Shockley

(10) Patent No.: US 8,857,892 B1
(45) Date of Patent: Oct. 14, 2014

(54) CAMP AND UTILITY TRAILER

(71) Applicant: Troy Shockley, Greenville, SC (US)

(72) Inventor: Troy Shockley, Greenville, SC (US)

( * ) Notice: Subject to any disclaimer, the term of this patent is extended or adjusted under 35 U.S.C. 154(b) by 0 days.

(21) Appl. No.: 14/016,531

(22) Filed: Sep. 3, 2013

(51) Int. Cl.
*B60P 3/00* (2006.01)
*B60P 3/34* (2006.01)

(52) U.S. Cl.
CPC ........................................ *B60P 3/34* (2013.01)
USPC ........................................... 296/169; 296/174

(58) Field of Classification Search
CPC ................ B60P 3/32; B60P 3/34; B60P 3/36; B60P 3/38; B60P 3/39; B60P 3/42
USPC ............... 296/169, 174, 186.1, 186.4, 50, 51, 296/26.12, 26.15, 172, 173, 176, 156, 159, 296/168, 146.8
See application file for complete search history.

(56) References Cited

U.S. PATENT DOCUMENTS

| 4,057,284 A * | 11/1977 | Blank ........................... 296/169 |
| 7,159,893 B2 | 1/2007 | Badger et al. |
| 7,165,779 B2 | 1/2007 | Badger et al. |
| 7,699,373 B2 * | 4/2010 | Miller ....................... 296/26.09 |

OTHER PUBLICATIONS

Lifetime. com web site dated Jul. 16, 2013.

* cited by examiner

*Primary Examiner* — Joseph D Pape
(74) *Attorney, Agent, or Firm* — Cort Flint; Thomas L. Moses; Southeast IP Group, LLC

(57) ABSTRACT

A combination camp and utility trailer is disclose comprising a trailer frame having a trailer floor, and a first and second trailer side extending longitudinally along opposing sides of the trailer floor. A first and second bed support are detachably carried by the first and second trailer sides. A pair of front pivotal gates and a pair of rear pivotal gates are carried by the first and second trailer sides at the front and rear of the trailer. The front and rear pivotal gates pivot approximately 180° to locate beneath the first and second bed supports in the pivot position. The first and second bed supports may be removed and stored to provide a utility space in a utility trailer configuration.

20 Claims, 5 Drawing Sheets

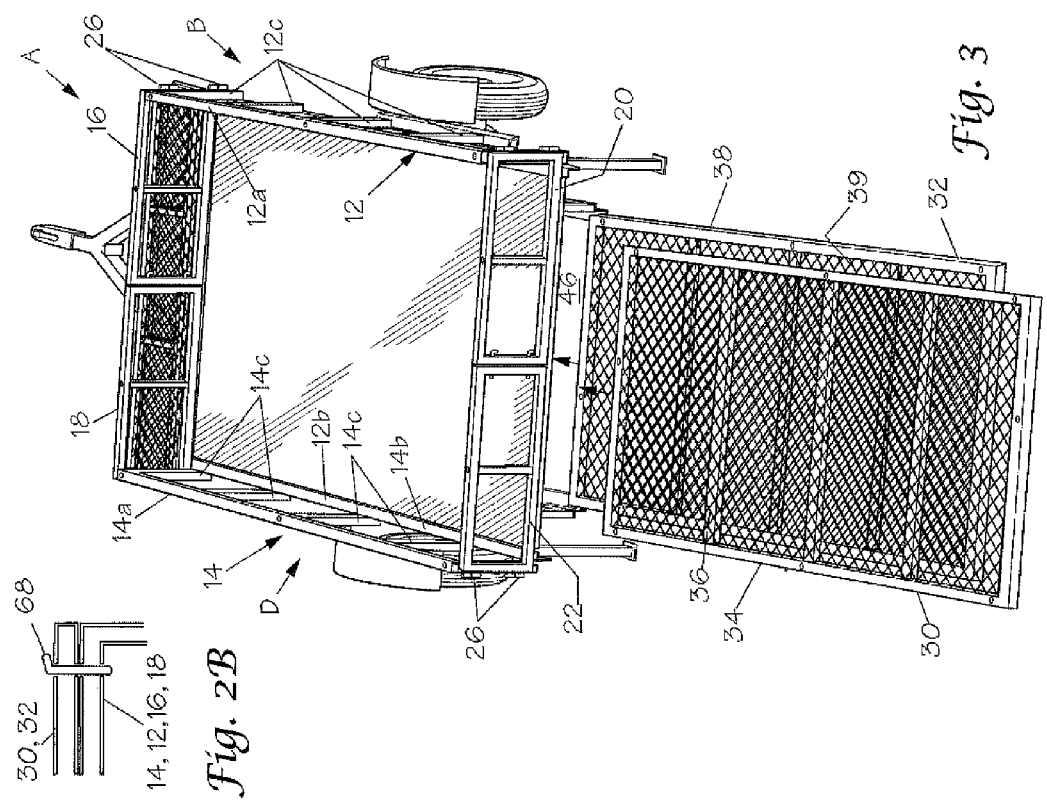

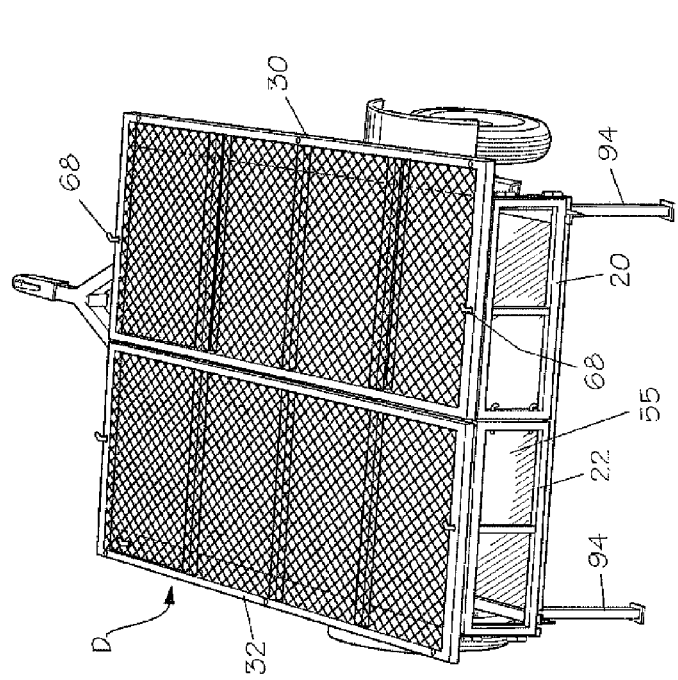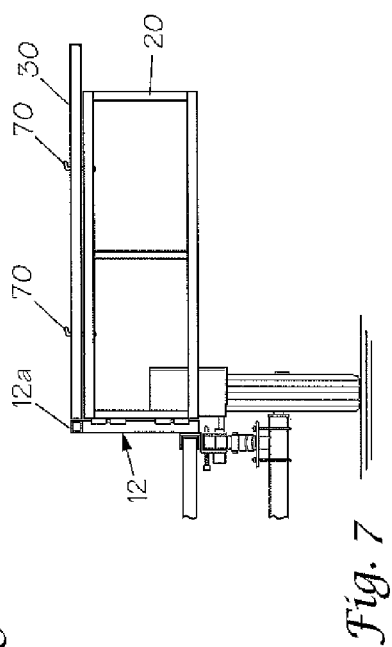

CAMP AND UTILITY TRAILER

BACKGROUND OF THE INVENTION

The invention relates to a combined outdoor camp and utility work trailer for recreation or work.

Prior tent camping trailers have been provided which typically use a special trailer built only for camping. The tent portion of the trailer pops up and, typically, has a hard roof or a soft tent roof. These tent camping trailers have limited utility for any other use. U.S. Pat. No. 7,159,893 and U.S. Pat. No. 7,165,779 disclose combination utility and camp trailers wherein configurable panel members are affixed to the trailer sides. However, the panel members cannot be removed from the trailer so the configurations are limited, and the trailer is rather complicated in construction. A tent trailer product is also available from Lifetime products of Clearfield, Utah which can provide a utility configuration and a camping configuration. The trailer frame can be used without a tent as a utility trailer, and the bed platforms of the trailer are affixed to the sides of the trailer and may be pivoted 90° to form the sidewalls of the trailer. The bed platforms cannot be stored on the top of the trailer and used for a utility platform. Thus, the prior art has not made a simplified camping and utility trailer wherein the bed supports can be detached and stored to provide for a simpler utility trailer.

SUMMARY OF THE INVENTION

The above objectives are accomplished according to the present invention by a camp and utility trailer comprising a trailer frame, a trailer floor, a first trailer side and a second trailer side. A pair of front end gates is pivotally attached to the first and second trailer sides, and a pair of rear end gates is pivotally attached to the first and second trailer sides at a rear end of the trailer. A first bed support and a second bed support are carried by the trailer frame. The first and second bed supports are removably carried by the trailer sides so they may be used in a bed support position in a camping configuration, and removed from the trailer and stored to provide a utility configuration. The front and rear end gates pivot to an open position in the camping configuration and to a closed position in the utility configuration. In the camping configuration, the gates at the front and rear of the trailer extend generally perpendicular to the trailer sides in the bed support position for sleeping. A storage for the bed supports may include a top storage frame carried atop the sidewalls and the front and rear gates wherein the stored beds are affixed to the top storage frame to provide a utility space below the stored beds. Alternately, the storage may include a bottom storage compartment beneath the trailer floor in which the first and second bed supports are stored.

DESCRIPTION OF THE DRAWINGS

The invention will be more readily understood from a reading of the following specification and by reference to the accompanying drawings forming a part thereof, wherein an example of the invention is shown and wherein:

FIG. 2B illustrates a drop-pin dropped into holes in the bed support frame and in the side and gate frames.

FIG. 3 is a right-hand rear perspective view illustrating a camp and utility trailer in a utility configuration wherein the bed supports are stored underneath a trailer leaving the trailer bed open for loading;

FIG. 6 is a rear perspective view of a camp and utility trailer wherein the bed supports are stored on top of the trailer.

FIG. 7 illustrates an embodiment where the end gates are lower that the top rails so that the bed supports are supported only by the gates.

DESCRIPTION OF A PREFERRED EMBODIMENT

Figure 1:
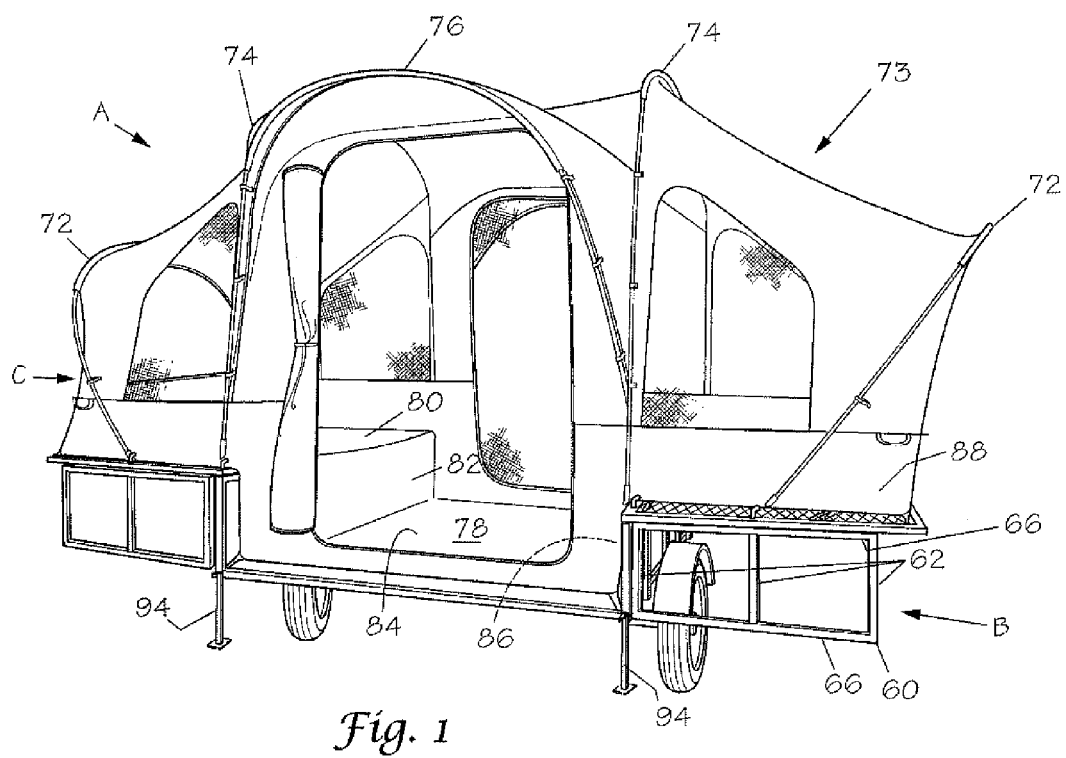
FIG. 1 is a right-hand rear perspective view of a camp and utility trailer in a camping configuration according to the invention.

Referring now to the drawings, the invention will be described in more detail.

Figure 2A:
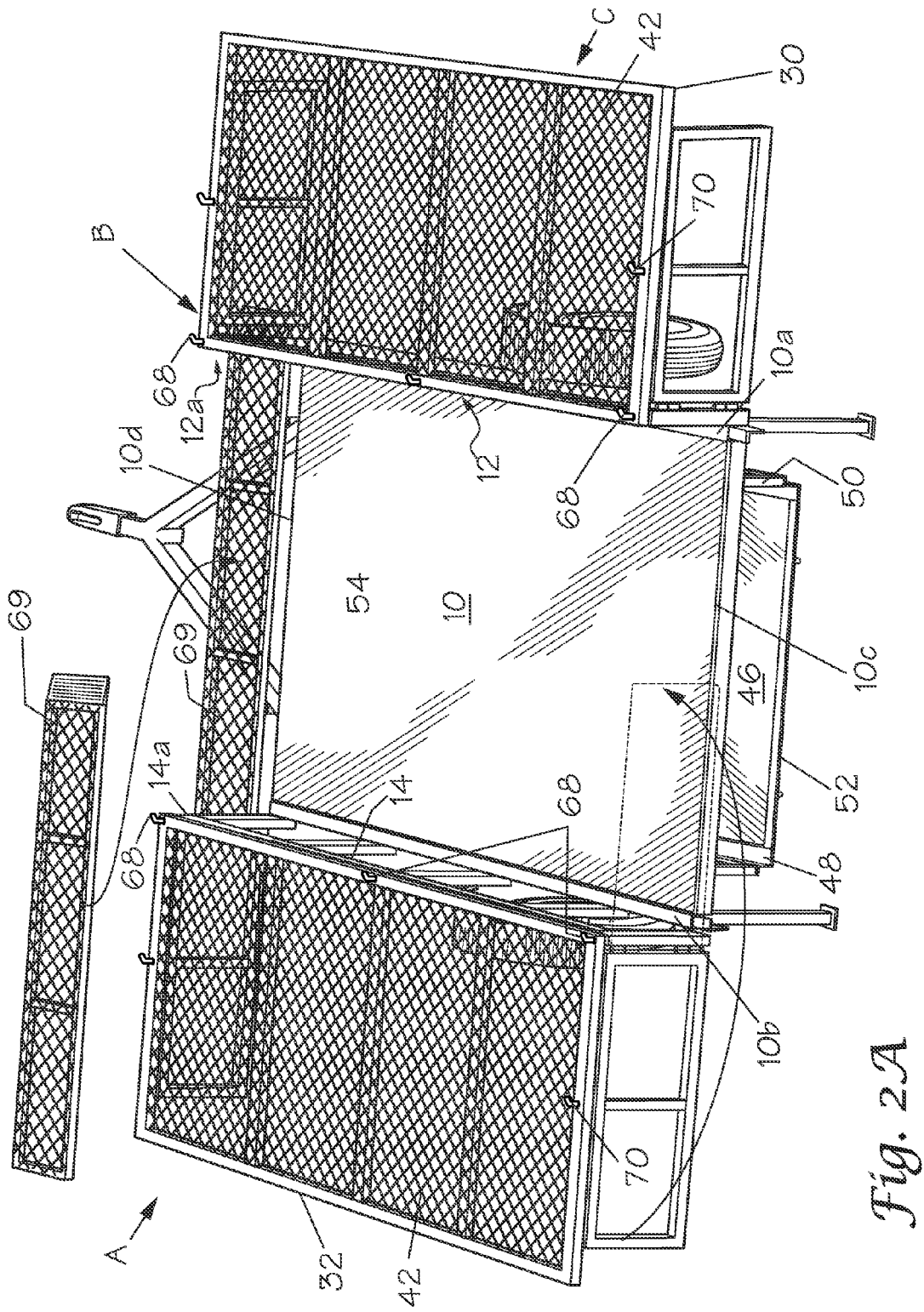
FIG. 2A is a right-hand rear perspective view illustrating a camp and utility trailer in a camping configuration with the bed supports removed from storage and placed in a stored position.
Figure 4:
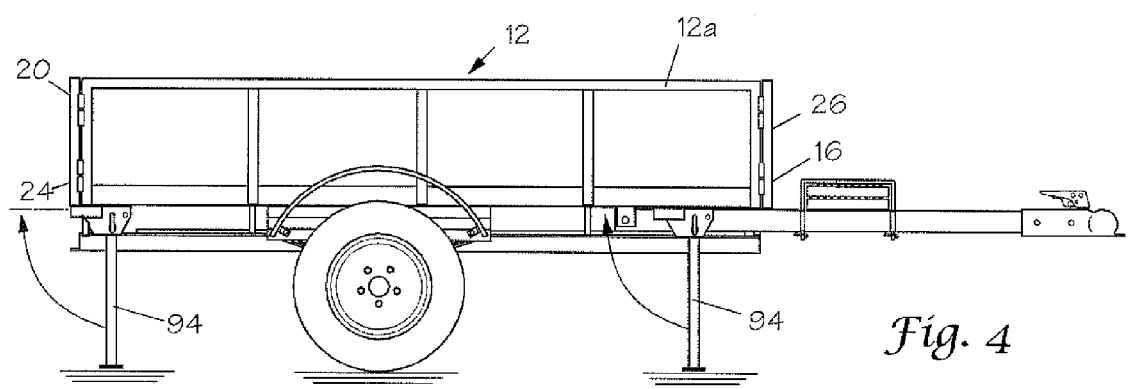
FIG. 4 is a right side elevation of a camp and utility trailer according to the invention.
Figure 5:
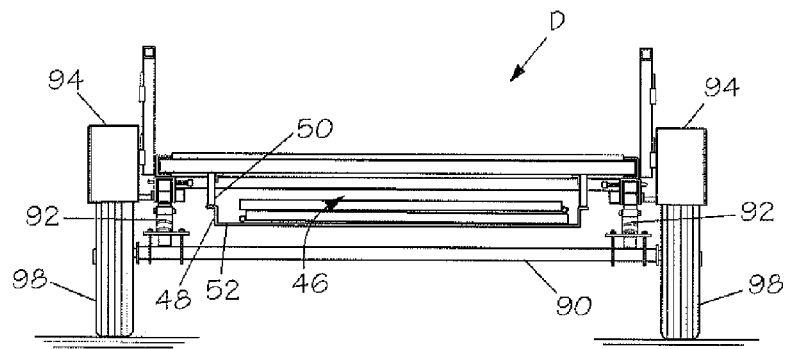
FIG. 5 is a rear end elevation illustrating a camp and utility trailer according to the invention.

As can best be seen in FIGS. 1 and 2, a camp and utility trailer, designated generally as A, is disclosed having a trailer frame B and trailer floor 10 carried by the trailer frame. The trailer floor may be constructed of any suitable material such as wood, metal, plastic, and includes side edges 10a, 10b along with front and rear end edges 10c, 10d. A plurality of transverse frame members 54 are integral with the first and second trailer sides for support as needed. A first trailer side 12 extends longitudinally along edge 10a, and a second trailer side 14 extends longitudinally generally along edge 10b of the floor. Trailer side 12 includes a top rail 12a, a bottom rail 12b, and vertical braces 12c extending between the top and bottom rails. Second trailer side 14 includes a top rail 14a, a bottom rail 14b, and vertical braces 14c. A pair of front gates includes first and second front pivotal gates 16, 18 pivotally carried by first and second trailer sides 12, 14 at a front end. A pair of rear pivot gates includes a first and second rear pivotal gate 20, 22 pivotally carried at a rear end of the trailer. The pivotal gates may be attached to frame B by hinges 26 or other suitable means (FIG. 3). The front and rear pivotal gates may be equal in their width and may have the same height as the top rails 12a and 14a of sides 12 and 14. Alternately, the gates may be lower than the top rails so that the bed supports are supported only on the gates. In this case, the gates may be lower in an amount generally equal to the thickness of the bed supports so that the bed supports and top rails are flush as shown in FIG. 2B. Drop-pins attach the bed supports to the gates, and the bed supports are positioned against the top rails.

A first bed support 30 and a second bed support 32 are removably attached to first and second trailer sides 12, 14 of the trailer frame. Bed support 30 includes a rectangular frame 34 and a mesh metal floor 36 carried by the rectangular frame. Likewise, second bed support 32 includes a rectangular frame 38 with an expanded metal mesh floor 39. The first and second bed supports may be detached from the trailer sides and moved between a bed position for sleeping and a utility position. The bed supports may be stored underneath the trailer floor 10 in a storage compartment 46. The storage compartment includes a hanger rack 48 and cross-frame members 52 supported by hanging elements 50 affixed to the underneath of the trailer frame. Alternately, the bed supports may be stored on top of trailer frame B by attaching them to the top rails of the top side rails 12a, 14a, and the tops of the front and rear pivotal gates. In this case, items may be carried on the top of the trailer such as kayaks, bicycles, etc., and a utility space 55 is provided below the stored beds for other camping equipment not suitable for the top storage (FIG. 6). The stored beds may be attached to the top rails by fastener members 68 which may be drop pins, cotter pins, bolts, screws, adhesive, hook and loop fasteners, or other suitable quick fastener means.

The four pivotal gates include a rectangular frame 60 having vertical braces 62 disposed between top and bottom rails 66. In the camping configuration, fastener members 68 interconnect first and second bed supports 30, 32 to the first and second frame sides 12 and 14. Removable attachment elements may include a first part 68 (pin, etc.) and a second part which may be a straight through hole 70 in the top rail of the trailer sides, end gates frames, and bed support frames for the pin, or other suitable complimentary connector for attaching the support beds and trailer frame together in a camping configuration. A pair of platforms 69 may be used as a storage platform, as ramps, or as a step up platform at the rear or front of the trailer.

In the camping configuration, as can best be seen in FIGS. 1 and 2, rear pivotal gates pivot generally to a transverse position relative to the trailer sides, and the front pivotal gates pivot generally transverse to the side. The bed supports are then fastened by members 68 along their sides to the top rails of the sides and fastened at their ends to the top rails of the open gates. In another version, the pivotal gates are not utilized and the beds are supported using the first and second trailer sides and removable angled bed supports extending from the trailer side. The front and rear ends of the trailer may be closed by other well known means.

The trailer is set up in an open position for erecting a tent 73 with flexible poles 72, 74, and 76. In the tent position, an integral tent cover 78 covers trailer frame B of the trailer. Covers 80 and 88 cover the first and second bed supports 32, 30. Side walls 82 and 86 cover trailer sides 14, 12. The trailer has at least one axle 90 with shock absorbers 92. Adjustable ground supports 94 for leveling the trailer are disposed at the first and second ends of the trailer, respectively.

While a preferred embodiment of the invention has been described using specific terms, such description is for illustrative purposes only, and it is to be understood that changes and variations may be made without department from the spirit or scope of the following claims.

What is claimed is:

1. A camp and utility trailer comprising:
   a trailer frame;
   a trailer floor carried by said trailer frame;
   a first trailer side extending longitudinally along a portion of said trailer floor;
   a second trailer side spaced from said first side extending longitudinally along a portion of said trailer floor;
   first and second front pivotal gates extending between said first and second trailer sides;
   first and second rear pivotal gates extending between said first and second trailer sides;
   a first bed support detachably carried by said first side of said trailer frame;
   a second bed support detachably carried by said second side of said trailer frame; and
   a trailer storage;
   said first and second bed supports being detachable from said trailer sides so they may be moved to said trailer storage on said trailer frame.

2. The trailer of claim 1 wherein said trailer storage includes an underneath storage compartment disposed underneath said trailer floor in which said first and second bed supports may be stored.

3. The trailer of claim 2 wherein said storage compartment includes a rack frame and hanger elements supporting said rack frame beneath said trailer floor.

4. The trailer of claim 1 wherein said trailer storage includes a top storage which includes said bed supports being carried on top of said first and second sides for storage of items.

5. The trailer of claim 4 including fastener members for attaching the first and second bed supports in a trailer storage position including one of a pin, drop-pin, bolt, screw, adhesive, and hook and loop fasteners.

6. The trailer of claim 1 including attachment elements removably attaching said first and second bed supports to one of said first and second trailer sides, said front and rear gates, and to both said trailer sides and gates when in a camping configuration.

7. The trailer of claim 6 wherein said attachment elements include one of a drop-pin, pin, bolt, and other mechanical devices.

8. The trailer of claim 1 wherein said first and second gates at the front and rear of the trailer extend generally transverse to the trailer sides in said open position to support said bed supports and pivot to a closed position for use as a utility trailer.

9. The trailer of claim 8 wherein each of said front and rear end gates include a four sided frame having a top rail engaging beneath said bed supports.

10. The trailer of claim 8 wherein said trailer storage includes a bottom storage compartment below said trailer floor in which said first and second bed supports may be placed.

11. The trailer of claim 10 wherein said storage compartment includes a storage rack and hanger elements mounting said storage rack beneath said trailer floor.

12. The trailer of claim 8 wherein said trailer storage includes a top storage on top of said trailer sides and said front and rear gates wherein said bed supports rest on said top rails of said trailer sides and said front and rear gates to provide a utility space.

13. The trailer of claim 12 including fastener members for attaching the first and second storage beds in a stored position on said top storage.

14. The trailer of claim 1 including releasable attachment elements interconnecting said first and second bed supports to at least one of said first and second trailer sides and front and rear gates in a camping configuration.

15. A camp and utility trailer comprising:
   a trailer frame;
   a trailer floor carried by said trailer frame;
   a first trailer side and a second trailer side extending longitudinally on opposing sides of said trailer floor;
   a front pair of pivotal gates carried by said first and second trailer sides at a front of said trailer;
   a rear pair of pivotal gates carried by said first and second trailer sides at a rear of said trailer;
   a first bed support carried by said trailer frame;
   a second bed support carried by said trailer frame; and
   said rear pair of pivotal gates and said front pair of pivotal gates having a closed position in a utility configuration and an open position approximately 180° from said closed position in a camping configuration wherein said front and rear gates support said bed supports.

16. The trailer of claim 15 wherein said first and second bed supports are removably attached to at least one of said trailer sides and pivotal gates so they may be moved between a bed position in a camping configuration, and in a storage position to be carried by said trailer storage in a utility configuration.

17. The trailer of claim 16 wherein said trailer storage includes a bottom storage compartment disposed beneath said trailer floor in which said first and second bed supports may be stored.

18. The trailer of claim 16 wherein said trailer storage includes a top storage which includes said bed supports carried on top of said trailer frame including said first and second trailer sides and said pivotal front and rear gates.

19. A combination camp and utility trailer comprising:
a trailer frame having a trailer floor;
a first trailer side and a second trailer side extending longitudinally along opposing sides of said trailer floor;
a first bed support and a second bed support detachably carried by said first and second trailer sides, respectively;
a pair of front pivotal gates carried by said first and second trailer sides at a front end of said trailer, and a pair of rear pivotal gates carried by said first and second trailer sides at rear of said trailer;
said front and rear pivotal gates having a closed position in a utility trailer configuration, and an open position pivoted approximately 180° from said closed position in a camp trailer configuration;
said front and rear pivotal gates engaging said first and second bed supports from underneath to support said bed supports in said open position; and
a storage for storing said first and second bed supports to provide a utility space in said utility trailer configuration.

20. The combination of claim 19 including a removable tent carried by said trailer frame in said camping configuration, said tent having a tent floor overlying said trailer floor, side floors overlying said first and second bed supports, and side walls overlying said first and second trailer walls.

* * * * *